United States Patent [19]

Skinner

[11] 4,087,400

[45] May 2, 1978

[54] SHEET VINYL FLOORING SEAM SEALING COMPOSITION

[75] Inventor: David B. Skinner, Allentown, Pa.

[73] Assignee: GAF Corporation, New York, N.Y.

[21] Appl. No.: 599,661

[22] Filed: Jul. 28, 1975

[51] Int. Cl.$^2$ .............................................. C08K 5/15
[52] U.S. Cl. ............................ 260/30.4 N; 156/331; 428/425
[58] Field of Search .................................. 260/30.4 N

[56] References Cited

U.S. PATENT DOCUMENTS

| | | | |
|---|---|---|---|
| 2,901,467 | 8/1959 | Croco | 260/30.4 N |
| 3,135,711 | 6/1964 | Thoma et al. | 260/30.4 N |
| 3,580,881 | 5/1971 | Lee | 260/30.4 N |

*Primary Examiner*—Harry Wong, Jr.
*Attorney, Agent, or Firm*—Walter C. Kehm; Joshua J. Ward

[57] ABSTRACT

Sections of sheet vinyl flooring having polyurethane wear layers are joined together with a sealing composition comprising between about 10 and about 75 wt. % uncured polyurethane, between about 20 and about 85 wt. % tetrahydrofuran and between about 5 and about 60 wt. % of an organic solvent for the polyurethane. The uncured polyurethane is preferably in the form of polyurethane prepolymer of the moisture/cure type and the organic solvent for the polyurethane preferably has an evaporation rate not more than 95 percent of the evaporation rate of the tetrahydrofuran.

9 Claims, No Drawings

SHEET VINYL FLOORING SEAM SEALING COMPOSITION

BACKGROUND OF THE INVENTION

In the installation of sheet vinyl flooring material having a polyurethane wear layer, considerable difficulty has been experienced in joining together various strips or sections of the flooring in such a way that the various sections are tightly joined with no seams showing and with the overall high gloss finish of the flooring unimpaired. These objectives have been especially difficult to obtain with sealing compositions which can be applied in a one step operation. For instance, one commercially used system for joining sections of vinyl flooring having polyurethane wear layers involves first using cement such as epoxy cement to join the sections together and then covering the resulting seam with polyurethane. Another known technique involves the use of two package polyurethane prepolymer sealant systems which must be mixed at the point of use. The polyurethanes used are such that they serve to cement the vinyl edges of the adjoining sections of flooring together and also fuse or weld the urethane finishes on the adjoining sections to produce a continuous, smooth, high gloss finish. Both of these systems depend basically on cementing the sections of flooring together and achieve a true fusion or welding effect only with respect to the polyurethane wear layer.

It is also known to use solvents for polyvinyl chloride (PVC), such as tetrahydrofuran (THF), in solution with PVC to join together sections of vinyl flooring having polyvinyl chloride wear layers. Such solutions containing THF function effectively to fuse or weld together the adjoining sections of polyvinyl chloride layers, but attempts to use such solutions on vinyl flooring having polyurethane wear layers have been unsuccessful due to poor appearance and lack of gloss in the areas of the seams.

SUMMARY OF THE INVENTION

It is, accordingly, an object of the present invention to provide improved seam sealing compositions for use in joining together sections of sheet vinyl flooring having polyurethane wear layers.

It is another object of the invention to provide an improved process for joining together sections of sheet vinyl flooring having polyurethane wear layers in such a way that the vinyl and polyurethane layers of one section are fused or welded to the corresponding layers of the other section and the resulting flooring surface has a uniform high gloss appearance.

The novel sheet vinyl flooring seam sealing composition of the invention comprises between about 10 and about 75 wt. % uncured polyurethane, between about 20 and about 85 wt. % tetrahydrofuran and between about 5 and about 60 wt. % of an organic solvent for the polyurethane. The solvent has an evaporation rate less than the evaporation rate of the tetrahydrofuran. The uncured polyurethane is preferably in the form of polyurethane prepolymer of the one package moisture/cure type with aliphatic or cycloaliphatic types being especially preferred and the solvent preferably has an evaporation rate not more than about 95 percent of the evaporation rate of the THF.

The process of the invention involves joining sections of sheet vinyl flooring having a high gloss polyurethane wear layer by first placing the sections to be joined in closely abutting relationship to form an unsealed seam between the sections and then applying seam sealing composition of the invention to the seam and curing the sealing composition to produce a welded seam having a high gloss finish and extending through the urethane wear layer and at least partially through the vinyl layer of the flooring.

DETAILED DESCRIPTION OF THE INVENTION

The invention provides a sheet vinyl flooring seam sealing composition and method for using same to seal together sections of sheet vinyl flooring havng a high gloss polyurethane wear layer in such a way that the respective vinyl and urethane layers are fused or welded together and a uniform high gloss finish is obtained on the completed flooring. As mentioned, the composition of the invention comprises between about 10 and about 75 wt. % uncured polyurethane, between about 20 and about 85 wt. % tetrahydrofuran and between about 5 and about 60 wt. % of an organic solvent for the polyurethane, said solvent having an evaporation rate less than the evaporation rate of the tetrahydrofuran (THF). While the invention is broadly applicable using proportions of ingredients as described above, preferred embodiments, especially using the preferred polyurethanes and solvents to be described below, include compositions having between about 20 and about 60 wt. % uncured polyurethane, between about 30 and about 70 wt. % THF and between about 10 and about 20 wt. % organic solvent for the polyurethane.

The uncured polyurethane used in the composition of the invention may include urethane lacquers as well as polyurethane prepolymer packages of the type well known in the art. The term curing as used in this application is intended to cover the solidifying of urethane lacquers (i.e., polyurethane dissolved in solvent) as well as the reaction of polyurethane prepolymers to form polyurethanes. While a wide variety of polyurethanes and polyurethane prepolymers may be used as the uncured polyurethane in the composition of the invention, the use of polyurethane prepolymers of the one package moisture/cure type is generally preferred. This results in a simple one component sealing composition which can be cured by exposure to the atmosphere. Where clear wear layers are involved, it is preferred that the polyurethane used be of the aliphatic or cycloaliphatic type since aromatic urethanes have a strong tendency toward discoloration. A suitable catalyst may, of course, be used especially where accelerated curing is desired. While not essential to the invention it is frequently found that especially desirable results are obtained when the polyurethane used in the composition of the invention is of at least the same general type as the polyurethane used in the wear layer of the flooring sections being joined. Suitable polyurethanes for use in the invention include, for instance, those prepared in a conventional manner such as by reacting hydroxylated polymers with organic polyisocyanates in the manner well known in the art. Suitable organic polyisocyanates include, for instance, ethylene diisocyanate; ethylidene diisocyanate; propylene-1, 2-diisocyanate; cyclohexylene-1,2-diisocyante; m-phenylene diisocyanate; 2,4-toluene diisocyanate; 2,6-toluene diisocyanate; 3,3'-dimethyl-4,4'-biphenylene diisocyanate; p,p',p''-triphenylmethane triisoene diisocyanate; 3,3'-diphenyl-4,4'-biphenylene diisocyanate; 4,4'-biphenylene diisocyanate; 3,3'-dichloro-4,4'-biphenylene diisocyanate; p,p',p"-triphenylmethane triisocyanate; 1,5-nephthalene diisocyanate; furfurylidene diisocyanate or polyisocyanates, in a blocked or inactive form such as the bis-phenyl carbamates of 2,4- or 2,6-toluene diisocyanate; p,p'-diphenyl methane diisocyanate; p-phenylene diisocyanate; 1,5-naphthalene diisocyanate and the like. It is preferred to use a commercially available mixture of toluene diisocyanates which contains 80 percent 2,4-toluene diisocyanate and 20 percent 2,6-toluene diisocyanate or 4,4'-diphenylmethane diisocyanate. Additional suitable polyurethanes are well known in the art and include materials such as described, for instance, in the pamphlet "Urethane Coatings" published by the Federation of Societies for Paint Technology, 1970.

Where use of a catalyst is desired, any catalyst suitable to the polyurethane involved may be used. Where used, catalyst is normally used in amounts between about 0.1 and about 5.0 wt. % based on the polyurethane prepolymers. Suitable catalysts for common one package, moisture/cure prepolymer packages include, for instance, methyl diethanolamine, cobalt naphthenate, lead naphthenate and dibutyl tin dilaurate. Catalysts must, however, be used with caution to avoid skinning over and bubbling of the polyurethane on the upper surface of the seam and adjacent areas of the polyurethane wear layer.

Organic solvents used with the uncured polyurethane and THF in the compositions of the invention include as mentioned those solvents for the uncured polyurethane having an evaporation rate not more than the evaporation rate of the THF. Preferred solvents have evaporation rates less than about 95% of the evaporation rate of the THF and more preferably less than about 50% of the evaporation rate of the THF. Suitable solvents include, for instance, toluene, xylene, methyl ethyl ketone, isopropanol, methyl isobutyl ketone, etc.

THF is used in the composition of the invention in amounts between about 20 and about 85 wt. % of the total composition, but in preferred embodiments is more usually present in amounts between about 30 and about 70 wt. % on the same basis. Solvent, while broadly used in amounts between about 5 and about 60 wt. % is more preferably present in amounts between about 10 and about 20 wt. %.

As indicated above, the invention involves a composition for sealing together sections of sheet vinyl flooring having polyurethane coatings. The above description of suitable polyurethanes for use in the composition of the invention is also generally applicable as a description of the various types of polyurethanes suitable for the polyurethane wear layers of the flooring sections to be joined in accordance with the process of the invention. Radiation curable polyurethanes are generally not preferred because of the general unavailability of suitable sources of radiation in areas such as homes where the process of the invention may be practiced. Polyurethane wear layers used on sheet vinyl flooring being joined in accordance with the invention typically have thicknesses between about 0.02 and about 0.15 millimeters (mm).

The sheet vinyl flooring to be joined in the process of the invention preferably has a vinyl substrate of the polyvinyl chloride (PVC) type generally used in vinyl flooring. Such PVC plastic may be any of the various PVC resin materials normally used in connection with manufacture of sheet vinyl flooring and may specifically include, but is not limited to, those described in U.S. Pat. No. 3,458,337, the disclosure of which is incorporated herein by reference. The vinyl substrate in such flooring materials is typically on the order of between about 0.125 to about 0.5mm thick and is frequently backed with foamed plastic in thicknesses such as up to about 5 millimeters. It should, of course, be understood that vinyl flooring having a polyurethane wear layer useful in connection with the invention may include suitable backing materials such as felt and various other layers of sealer, plastisols, pigmented layers, etc., all as known in the art relating to the manufacture of conventional sheet vinyl flooring materials.

The process of the invention involves generally the joining together of sections of sheet vinyl flooring having a high gloss polyurethane wear layer using the sealing composition of the invention to provide a high gloss seal which fuses or welds not only the polyurethane wear layer but also all or part of the vinyl substrate. In some instances it is possible for the sealing composition to penetrate the flooring sufficiently to fuse or weld together not only the polyurethane coating and the upper portion of the vinyl substrate, but also lower portions of the vinyl substrate, plastic foam backing, etc. For proper practice of the invention and acceptable strength of finished seams, it is only necessary, however, that the fused or welded portion of the seam extend at least partially into the vinyl substrate, such as to a minimum depth of about 0.06 millimeters into the vinyl substrate.

In order to obtain optimum results, it is desirable that the sections of flooring to be sealed together be in very closely abutting relationship when the sealing composition is applied. To accomplish this it is preferred to "double cut" the sections of flooring in a conventional manner.

Curing of the composition of the invention, when used in the process of the invention, may be by any suitable means, but is preferably by exposure to the atmosphere for periods ranging from a minimum of about 12 hours where catalyst is not used to a minimum of about 8 hours where catalyst is used. With the use of catalyst, the seams are generally cured sufficiently for the floor to be walked upon in normal service in periods of time ranging from about 8 to about 16 hours and where catalyst is not used, use of the preferred moisture/cure types of polyurethane prepolymers results in seams which are generally ready for use in periods of time ranging from about 12 to about 24 hours.

Application of the composition of the invention may be by any suitable means such as a conventional applicator bottle, paint brush, etc. Since excessive thicknesses of the sealing composition above the polyurethane wear layer can cause bubbling of the sealing composition, it is preferred that the sealing be applied in such a manner that the uncured composition does not extend more than about 0.4mm above the upper surface of the polyurethane wear layer. In applying the composition, the use of a mechanical applicator or applicator bottle having means for opening the seam to insure that the sealing composition can penetrate into the seam is preferred.

For ease of application it is preferred that the compositions of the invention have viscosities between about 20 and about 300 centipoise (cps). This is especially important where application is to be by mechanical applicators or applicator bottles. For other methods of application, any suitable viscosities may be used, it being understood that the viscosity is affected by the particular solvent and types of polyurethanes or polyurethane prepolymers used as well as the amount of THF used.

By the use of the three component system disclosed herein as a sealing composition, a number of advantages are obtained over the prior art compositions mentioned above. Specifically, use of the particular combination of ingredients specified herein results in a one package sealing composition which may be applied in one pass by any suitable means such as conventional applicators, brushes, etc., and which has good shelf life. In using these compositions there is a simultaneous fusing or welding of both the polyurethane wear layer and at least a portion of the vinyl substrate to form a strong, continuous flooring with a continuous uniform, high gloss wear layer. Use of the composition of the invention also minimizes solvent bubble formation. This is an especially severe problem in joining flooring sections having polyurethane wear layers. In this respect it has been found that the use of THF as the sole solvent for the polyurethane is unsatisfactory because of its high evaporation rate and resultant skinning over and bubble formation. While THF alone has been found unsuitable because of its bubbling effect, inclusion of THF in the composition of the invention is essential in order to fuse the vinyl substrate on both sides of the seam. The organic solvent forming the third component of the invention is needed to promote uniform solvent evaporation and minimize the bubbles which form if THF alone is used. The uncured urethane is, of course, necessary to provide the desired uniform, high gloss surface on the finished flooring.

The following examples illustrate possible embodiment of the invention but are not intended to limit the scope of the invention.

EXAMPLE I

In this example the sheet vinyl flooring, sections of which are to be joined by the process of the invention using the composition of the invention, is a conventional flooring having a latex size coated asbestos felt base, a layer of foamed PVC printed with an appropriate design and a 0.254 mm thick, clear topcoat of fused PVC over which is a 0.05 mm thick, cured polyurethane wear layer. The wear layer has been formed from a catalyzed xylene solution of a moisture/cure urethane prepolymer which is a polyether/polyester blend based on 4,4'-methylene dicyclohexane diisocyanate and trimethylolpropane plus propylene glycol ether and adipic acid ethylene glycol ester. The PVC topcoat has the following composition:

| Composition | Parts by Weight |
| --- | --- |
| PVC homopolymer dispersion resin (I.V. 1.51) | 100 |
| 2,2,4-trimethylpentanediolisobutyrate benzoate plasticizer | 54 |
| Heat and light stabilizer | 5 |
| Epoxydized soya oil | 6 |
| Mineral spirits | 3 |
| Alkylphenol ether of polyethylene glycol | 0.6 |

Sheets of this flooring material are joined together by double cutting adjoining sheets in a conventional manner to allow the edges to be joined to be placed in very close abutment. The sealing composition used has 40 percent by weight of the same polyurethane used in forming the wear layer of the flooring, 45 wt. % THF and 15 wt. % toluene. This composition is applied to the seam with a vinyl weld applicator which forces open the seam to allow penetration of the sealing composition into the seam. The sealing composition has a viscosity of about 60 centipoises and is applied to the seam in a ¼ inch bead having a maximum height above the top surface of the polyurethane wear layer of 0.15 mm. Following application, the sealed seam is allowed to cure by exposure to the atmosphere for at least 16 hours after which the sections of flooring are found to be firmly joined together with the wear layer and vinyl topcoat being completely fused or welded together by the sealing composition. The resultant joined flooring has a smooth, high gloss appearance and it is found extremely difficult to detect the location of the seam.

EXAMPLE II

Flooring of the type described in Example I may be joined using seam sealing composition as described in Example I except that a brush rather than an applicator is used to apply the sealing composition to the seam.

EXAMPLE III

Flooring of the type described in Example I may be sealed by the method described in Example I using a seam sealing composition consisting of 35% of the same polyurethane used in the composition of Example I, 49.65 wt. % THF, 15 wt. % xylene, and 0.35 wt. % dibutyl tin dilaurate.

EXAMPLE IV

Flooring of the type described in Example I may be sealed by the process of Example I using a sealing composition supplied in two packages with the first package containing polyurethane prepolymer based on 1,5-naphthalene diisocyanate, THF and a portion of the solvent and the second package containing lead naphthenate catalyst and the remainder of the solvent. The total sealing composition (including contents of both packages) used in this example may consist of 40 wt. % polyurethane prepolymer, 39 wt. % THF, 20 wt. % toluene and 1 wt. % catalyst.

EXAMPLE V

Another suitable uncured polyurethane for use in forming sealing compositions of the invention is a polyurethane lacquer obtained by reacting stoichiometric amounts of polyethylene terephthalate and 2,4-toluene diisocyanate.

EXAMPLE VI

Additional suitable compositions of the invention include those set forth in Table I below in which any suitable solvents and prepolymers may be used.

TABLE I

| | Wt. % of Ingredients | | |
| --- | --- | --- | --- |
| Composition No. | Polyurethane Prepolymer | THF | Solvent |
| 1 | 10 | 30 | 60 |
| 2 | 20 | 50 | 30 |
| 3 | 30 | 50 | 20 |
| 4 | 40 | 30 | 30 |
| 5 | 40 | 20 | 40 |
| 6 | 10 | 85 | 5 |
| 7 | 70 | 20 | 10 |
| 8 | 75 | 20 | 5 |
| 9 | 55 | 35 | 10 |
| 10 | 15 | 30 | 55 |
| 11 | 10 | 75 | 15 |
| 12 | 25 | 35 | 40 |

While the invention has been described above with respect to preferred embodiments thereof, it will be understood by those skilled in the art that various changes and modifications may be made without departing from the spirit or scope of the invention.

What is claimed is:

1. A sheet vinyl flooring seam sealing composition for joining sections of sheet vinyl flooring having high gloss polyurethane wear layers which comprises:
   a. between about 10 and about 75 wt% uncured polyurethane.
   b. between about 20 and about 85 wt% tetrahydrofuran; and
   c. between about 5 and about 60 wt% of an organic solvent for the uncured polyurethane, said solvent having an evaporation rate less than about 95% of the evaporation rate of the tetrahydrofuran in the composition and being selected from the group consisting of toluene, xylene, methyl ethyl ketone, isopropanol and methyl isobutyl ketone.

2. The composition of claim 1 in which the uncured polyurethane is polyurethane prepolymer.

3. The composition of claim 2 in which the prepolymers are of the moisture/cure type.

4. The composition of claim 3 in which the polyurethane prepolymer is of the aliphatic or cycloaliphatic type.

5. The composition of claim 4 in which the solvent is toluene.

6. The composition of claim 2 in which the organic solvent has an evaporation rate less than about 50% of the evaporation rate of the THF.

7. The composition of claim 2 in which the viscosity of the composition is between about 20 and about 300 cps.

8. The composition of claim 5 in which the polyurethane prepolymer is based on 4,4'-methylene dicyclohexane diisocyanate and trimethylol propane plus polypropylene glycol ether and adipic acid/ethylene glycol ester.

9. The composition of claim 1 comprising between about 20 and about 60 wt. % polyurethaneprepolymer based on 4,4'-methylene dicyclohexane diisocyanate and trimethylol propane plus polypropylene glycol ether and adipic acid/ethylene glycol ester, between about 30 and about 70 wt. % tetrahydrofuran and between about 10 and about 20 wt. % toluene.

* * * * *